United States Patent
Upadhyay et al.

(10) Patent No.: US 11,151,473 B1
(45) Date of Patent: Oct. 19, 2021

(54) SYSTEMS AND METHODS FOR MACHINE-LEARNING AUGMENTED APPLICATION MONITORING

(71) Applicant: JPMorgan Chase Bank, N.A., New York, NY (US)

(72) Inventors: Sudhir Upadhyay, Edison, NJ (US); Sergul Aydore, New York, NY (US); Tulasi Movva, Trumbull, CT (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 1000 days.

(21) Appl. No.: 15/786,736

(22) Filed: Oct. 18, 2017

Related U.S. Application Data

(60) Provisional application No. 62/410,040, filed on Oct. 19, 2016.

(51) Int. Cl.
| | |
|---|---|
| *G06N 20/00* | (2019.01) |
| *G06F 11/30* | (2006.01) |
| *G06F 16/23* | (2019.01) |
| *G06F 16/2458* | (2019.01) |

(52) U.S. Cl.
CPC ......... *G06N 20/00* (2019.01); *G06F 11/3082* (2013.01); *G06F 16/235* (2019.01); *G06F 16/2462* (2019.01)

(58) Field of Classification Search
CPC ...................................................... G06N 20/00
USPC ...................................................... 706/15, 45
See application file for complete search history.

(56) References Cited

U.S. PATENT DOCUMENTS

| | | | | |
|---|---|---|---|---|
| 10,489,711 | B1 * | 11/2019 | Inbar | H04L 41/142 |
| 10,698,790 | B1 * | 6/2020 | Lieberman | G06F 11/3612 |
| 2013/0294647 | A1 * | 11/2013 | Bouganim | G06K 9/6202 |
| | | | | 382/103 |
| 2015/0081890 | A1 * | 3/2015 | Richards | H04L 43/16 |
| | | | | 709/224 |
| 2015/0254330 | A1 * | 9/2015 | Chan | G06F 16/219 |
| | | | | 707/613 |
| 2016/0350173 | A1 * | 12/2016 | Ahad | G06F 11/3072 |

OTHER PUBLICATIONS

Lu et. al, Fault-tolerant Service Level Agreement lifecycle management in clouds using actor system, Future Generation Computer Systems 54 (2016) 247-259, 2015 Elsevier (Year: 2015).*

* cited by examiner

*Primary Examiner* — David R Vincent
(74) *Attorney, Agent, or Firm* — Greenberg Traurig LLP

(57) ABSTRACT

Systems and methods for machine-learning augmented application monitoring are disclosed. In one embodiment, in an information processing apparatus comprising at least one computer processor and a memory, a method for machine-learning augmented application monitoring may include: (1) receiving data from a plurality of data sources; (2) storing the data in a data store; (3) transforming the data; (4) extracting one or more feature and metric from the transformed data; (5) feeding the feature and metric into a machine learning model to identify at least one contributing metric; and (6) associating the contributing metric with at least one incident.

20 Claims, 2 Drawing Sheets

SYSTEMS AND METHODS FOR MACHINE-LEARNING AUGMENTED APPLICATION MONITORING

RELATED APPLICATIONS

This application is claims priority to U.S. Provisional patent Application Ser. No. 62/410,040, filed Oct. 19, 2016, the disclosure of which is hereby incorporated by reference in its entirety.

BACKGROUND OF THE INVENTION

1. Field of the Invention

The present disclosure generally relates to systems and methods for machine-learning augmented application monitoring.

2. Background of the Related Art

As Information Technology environments become more complex, legacy rules-based systems may be seen as deterministic. Rules-based infrastructures, however, often result in inconsistencies and ambiguities.

SUMMARY OF THE INVENTION

Systems and methods for machine-learning augmented application monitoring are disclosed. In one embodiment, in an information processing apparatus comprising at least one computer processor and a memory, a method for machine-learning augmented application monitoring may include: (1) receiving data from a plurality of data sources; (2) storing the data in a data store; (3) transforming the data; (4) extracting one or more feature and metric from the transformed data; (5) feeding the feature and metric into a machine learning model to identify at least one contributing metric; and (6) associating the contributing metric with at least one incident.

In one embodiment, the feature may be a computer feature, and the metric may be a value associated with the computer feature.

In one embodiment, at least one of the plurality of data sources may include a system monitoring program, a source of an application metric, a service level agreement, etc.

In one embodiment, the step of transforming the data may include transforming the data to a proper data structure for the machine learning model.

In one embodiment, the method may further include setting an alert threshold based on the metric.

In one embodiment, the method may further include monitoring data from the plurality of data sources; detecting an anomaly in the data that exceeds a threshold; and executing an action in response to the detecting. The steps of feeding, monitoring, and detecting may be repeated.

In one embodiment, the action may include terminating an application associated with the feature.

According to another embodiment, a system for machine-learning augmented application monitoring may include a plurality of data sources; a data ingestion layer; a data store; and a machine learning engine comprising at least one computer processor. The data ingestion layer may receive data from the plurality of data sources. The data store may store the ingested data and transforms the data. The machine learning engine may extract one or more feature and metric from the transformed data. The machine learning engine may execute a machine learning model to identify at least one contributing metric. The machine learning engine may associate the contributing metric with at least one incident.

In one embodiment, the feature may be a computer feature, and the metric may be a value associated with the computer feature.

In one embodiment, at least one of the plurality of data sources may include a system monitoring program, a source of an application metric, a service level agreement, etc.

In one embodiment, the data may be transformed into a proper data structure for the machine learning model.

In one embodiment, the machine learning engine may set an alert threshold based on the metric.

In one embodiment, the machine learning engine may monitor data from the plurality of data sources, detect an anomaly in the data that exceeds a threshold, and execute an action in response to the detecting. The machine learning engine may repeat the steps of feeding, monitoring and detecting.

In one embodiment, the action may include terminating an application associated with the feature.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments disclosed herein are directed to a machine-learning approach that is data-driven, not rule-based, so flexible logic can be applied in real-time. This is important, especially for infrastructures that are in a constant state of flux.

In embodiments, traditional application monitoring systems that use a combination of static rules to generate alerts may be enhanced using machine learning algorithms that learn from historical conditions and yield more reliable alarms.

Figure 1:
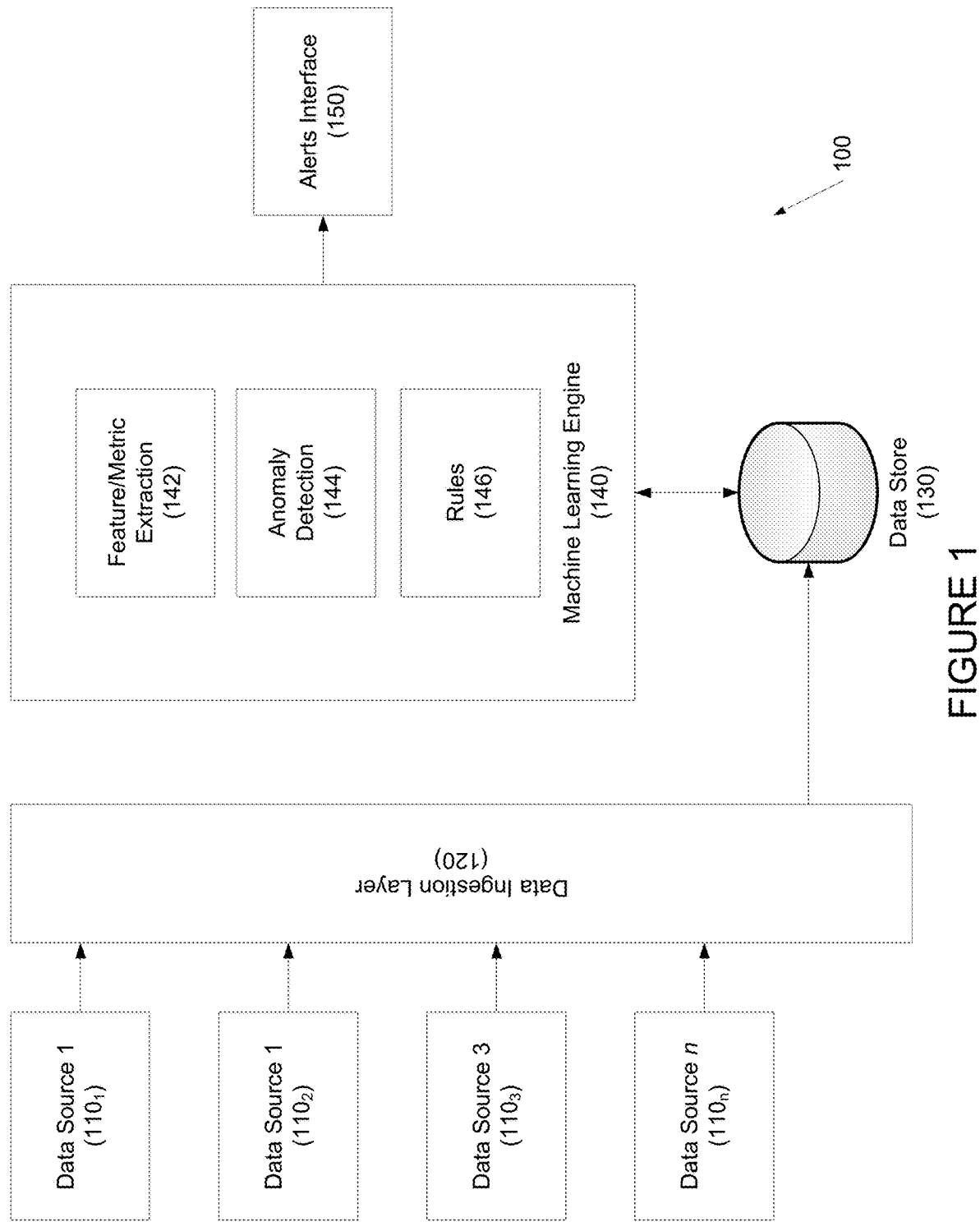
FIG. 1 depicts a system for machine-learning augmented application monitoring according to one embodiment.

Referring to FIG. 1, a block diagram of a system for machine-learning augmented application monitoring is disclosed according to one embodiment. System 100 may a plurality of data sources $110_1$, $110_2$, ... $110_n$. For example, data sources 110 may include system monitoring software, such as Geneos and Nagious, that collect monitoring data from multiple components in the system—from application metrics to CPU, network, hardware, service level agreements (SLAs), databases etc. These data sources are exemplary only; additional data sources may be used as is necessary and/or desired.

In one embodiment, the modeling of the data from data sources 110 may vary. For example, the attributes that are used in modelling may not be the actual data source, but the contributing metrics for each application. The prediction for different application may vary significantly from application to application.

Data may be provided by sources $110_1$, $110_2$, ... $110_n$ to data ingestion layer 120 which may process the data for storage in data store 130, which may be Hadoop or other suitable big data storage.

Machine learning engine 140 may access data in data store 130. In one embodiment, machine learning engine may include feature/metric extraction 142, anomaly detection 144, and rules 146.

In one embodiment, feature/metric extraction 142 may explore existing data and identify and/or filter the relevant features and metrics for that data. For example, features may include parameters such as CPU usage, memory usage, network usage, etc., and metrics may include values for those parameters. In one embodiment, anomaly detection 144 may recognize (e.g., metrics values at certain day/time, etc.) that may result in an outage, or incidents that occurred without indicative warnings.

In one embodiment, rules 146 may include one or more processing rule that may be used as a basis for training feature/metric extraction 142 and/or anomaly detection 144.

In one embodiment, alerts interface 150 may interact with machine learning engine 140, and may take the outputs of feature/metric extraction 142 and/or anomaly detection 144 and may take an action in response to the output(s).

In one embodiment, some or all of the elements of FIG. 1 may reside on one or more server, and may be modified or adjusted as data points are collected and performance is assessed.

Figure 2:
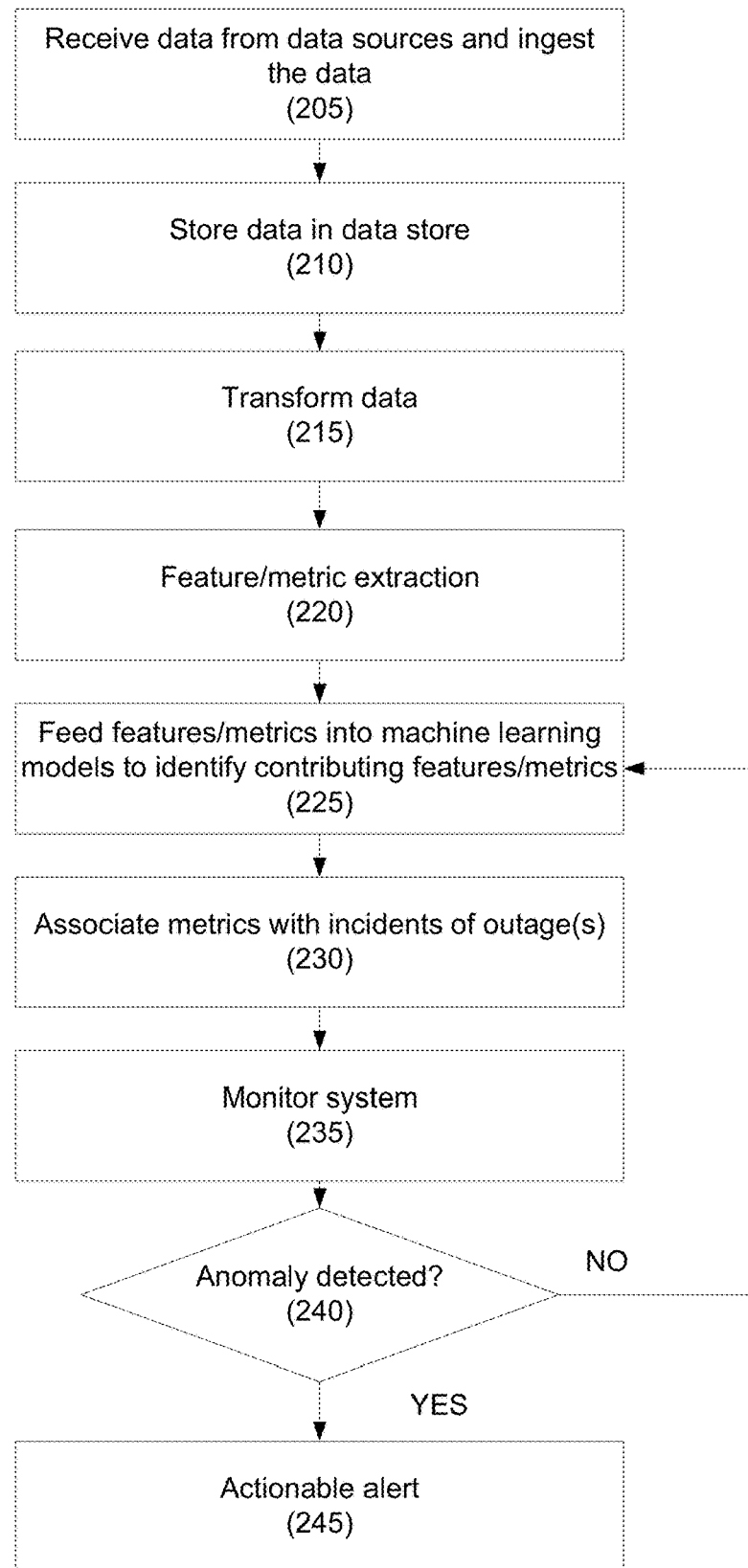
FIG. 2 depicts a method for machine-learning augmented application monitoring according to one embodiment.

Referring to FIG. 2, a method for machine-learning augmented application monitoring is disclosed according to one embodiment.

In step 205, data may be received from one or more data source, such as from agents, application logs, database statistics, application metrics, human entered comments, etc. In one embodiment, the data sources may be selected automatically based on, for example, machine learning. In another embodiment, the data sources may be selected manually. In still another embodiment, a combination of manual and automatic data source selection may be used.

In one embodiment, the data sources may provide streaming data that may be received in real-time, or substantially in real-time. In another embodiment, the data may be received in batches.

In one embodiment, the data may be passed through a data ingestion layer. In one embodiment, the data ingestion layer may validate, format, apply transformation rules to prepare for persistence and model digestion, etc. For example, the data may be transformed into the proper data structure for the model(s).

In step 210, the data may be persisted in a store, such as a Hadoop data store, or any suitable data store (e.g., a big data store).

In step 215, the persisted data may be curated and/or transformed into a format that may be leveraged by one or more machine learning models as is necessary and/or desired. In one embodiment, curation may include, for example, filtering out noise, conversion to appropriate units, scaling, etc.

In step 220, features and metrics may be extracted from the data. In one embodiment, one or more algorithms may be used, and the algorithm may depend on the incoming data. This may be done in real-time, or substantially in real-time. As discussed above, features may include parameters such as CPU usage, memory usage, network usage, etc., and metrics may include values for those parameters. In one embodiment, features and metrics generally are provided by the application, hardware, logs, databases, networks, etc. In one embodiment, the features and metrics may be received as raw data and may be transformed (e.g., scaled, formatted, etc.) as is necessary and/or desired.

In step 225, the features and metrics may be consumed by one or more machine-learning model. In one embodiment, the machine-learning models may be selected from existing open source models that fit the data most suitably, or from a custom model. In one embodiment, the machine-learning models may be trained on a number of metrics and historical outages. For example, metrics that contribute to the historical outages may include: "CPU": [u"percentWaitTime", u"percentIrq", u"percentIdle,tate", u"percentUtilization", u"percentUserTime", u"percentKernelTime", u"clockSpeed", u"percentSoftIrq," etc.]. It should be noted that these metrics are exemplary only, and other metrics may be used as is necessary and/or desired.

In one embodiment, the machine-learning model may leverage features and metrics related to other aspects of the system, the network, and/or the application(s), and may label the features and metrics with prior incidents of one or more outage.

In one embodiment, in addition to numerical metrics, application and systems logs may be passed through a text analytics engine. The text analyzer may then extract keywords from the unstructured text, and follow a similar model of assigning a score to specific keywords if an incident "T" occurred after "n" occurrences of the keyword "k". The model may also aggregate a set of keywords appearing together and occurrence an incident "T1". As additional data is collected, the model may predict occurrences based on metrics, keywords, or a combination thereof.

In one embodiment, certain metrics, such as memory usage, disk accesses per second, CPU load, network traffic, etc. may be extracted from the data. Other metrics may include application specific metrics, disk input/output, network latency, database query processing time, CPU load averages, etc.

In one embodiment, the metrics may be used to set or adjust alert thresholds. For example, if a CPU alert threshold is set at 80% usage between 9:00 AM and 5:00 PM on a business day, but there is no negative consequence when this usage is reached during this timeframe, the threshold may be adjusted upward.

In one embodiment, the historical data may be used to adjust or override statically defined rules.

In one embodiment, confidence factors may be assigned to each threshold. For example, the model may assign a confidence value, score, etc. of 0.80 to indicate the probability of prediction—i.e., the model can say with 80% confidence, (based on historical data) that when the CPU was 90% for 30 minutes and load averages continued to be above 4, there is a possibility that application will miss its SLA 4 or of 5 times.

In step 230, the metrics may be associated with an outage, such as unavailability, reduced availability, etc. In one embodiment, the outages may be of different categories and severity levels. For example, each outage with varying severity may be assigned a number, label, etc. If the value of percentUserTime=95% for Time "T", and incident I, occurred "t" seconds after this, the model will may give it a score of "x". The higher the score, the more the probability of incident occurring within a time frame "T". Initially, that there may be no correlation between collected metrics and the observed outages. Over a period of time, however, with a large of number, different features (metrics), patterns will be identified that may yield higher scores.

In one embodiment, a series of events or metrics may be pipelined into a sequence operation with output from one event feeding into a subsequent step in the flow—thereby building a network that may resemble well known neural networks in the machine learning.

In step 235, the system may monitor incoming data. If, in step 240, an anomaly in the data, events, or metrics is identified, one or more actionable alerts may be provided. In one embodiment, an automatic action, such as disconnecting from a network, etc. may be taken in response to the alert.

In one embodiment, the anomaly may be detected based on the alert thresholds, discussed above.

In one embodiment, the alarms may be based on meeting a service level agreement, security issues, application errors, performance degradation, excessive or unusual resource usage, network glitches or unavailability, etc.

Although several embodiments have been disclosed, it should be recognized that these embodiments are not exclusive to each other.

In one embodiment, the process of extracting features from collected metrics may be an iterative process and may require tweaking/tuning over a period of time. For example, the model may be run with different permutations/combinations of metrics and the performance may be monitored.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for machine-learning augmented application monitoring comprising:

in an information processing apparatus comprising at least one computer processor and a memory:
receiving data from a plurality of data sources; storing the data in a data store;
transforming the data;
training a machine learning model based on a processing rule, training features, and a number of metrics;
extracting one or more feature and metric from the transformed data;
feeding the feature and metric into the machine learning model to identify at least one contributing metric;
extracting a plurality of keywords from an application log and a system log;
generating a set of keywords from the plurality of keywords based on an appearance of one or more keywords of the plurality of keywords and an occurrence of an incident, wherein the incident represents an outage; and associating the contributing metric and the set of keywords with at least one incident;

predicting, by the machine learning model, one or more occurrences of the incident based on the set of keywords; and updating the processing rule based on historical data.

2. The method of claim 1, wherein the feature comprises a computer feature, and the metric is a value associated with the computer feature.

3. The method of claim 1, wherein at least one of the plurality of data sources comprises a system monitoring program.

4. The method of claim 1, wherein at least one of the plurality of data sources comprises a source of an application metric.

5. The method of claim 1, wherein at least one of the plurality of data sources comprises a service level agreement.

6. The method of claim 1, wherein the step of transforming the data comprises transforming the data to a proper data structure for the machine learning model.

7. The method of claim 1, further comprising: setting an alert threshold based on the metric.

8. The method of claim 1, further comprising:
monitoring data from the plurality of data sources;
detecting an anomaly in the data that exceeds a threshold; and
executing an action in response to the detecting.

9. The method of claim 8, further comprising: repeating the steps of feeding, monitoring and detecting.

10. The method of claim 9, wherein the action comprises terminating an application associated with the feature.

11. A system for machine-learning augmented application monitoring comprising:
a plurality of data sources; a data ingestion layer;
a data store; and
a machine learning engine comprising at least one computer processor; wherein:
the data ingestion layer receives data from the plurality of data sources;
the data store stores the ingested data and transforms the data;
training a machine learning model based on a processing rule, training features, and a number of metrics;
the machine learning engine extracts one or more feature and metric from the transformed data;
the machine learning engine executes the machine learning model to identify at least one contributing metric;
extracting a plurality of keywords from an application log and a system log;
generating a set of keywords from the plurality of keywords based on an appearance of one or more keywords of the plurality of keywords and an occurrence of an incident, wherein the incident represents an outage;
the machine learning engine associates the contributing metric and the set of keywords with at least one incident;
the machine learning model predicts one or more occurrences of the incident based on the set of keywords; and
the machine learning model updates the processing rule based on historical data.

12. The system of claim 11, wherein the feature comprises a computer feature, and the metric is a value associated with the computer feature.

13. The system of claim 11, wherein at least one of the plurality of data sources comprises a system monitoring program.

14. The system of claim 11, wherein at least one of the plurality of data sources comprises a source of an application metric.

15. The system of claim 11, wherein at least one of the plurality of data sources comprises a service level agreement.

16. The system of claim 11, wherein the data is transformed into a proper data structure for the machine learning model.

17. The system of claim 11, wherein the machine learning engine sets an alert threshold based on the metric.

18. The system of claim 11, wherein the machine learning engine monitors data from the plurality of data sources, detects an anomaly in the data that exceeds a threshold, and executes an action in response to the detecting.

19. The system of claim 18, wherein the machine learning engine repeats the steps of feeding, monitoring and detecting.

20. The system of claim 19, wherein the action comprises terminating an application associated with the feature.

* * * * *